Aug. 21, 1934.   D. G. TAYLOR   1,970,987
TEMPERATURE CONTROL APPARATUS
Filed Jan. 10, 1931   2 Sheets-Sheet 1

INVENTOR
DANIEL G. TAYLOR
BY
ATTORNEYS

Aug. 21, 1934.    D. G. TAYLOR    1,970,987
TEMPERATURE CONTROL APPARATUS
Filed Jan. 10, 1931    2 Sheets-Sheet 2
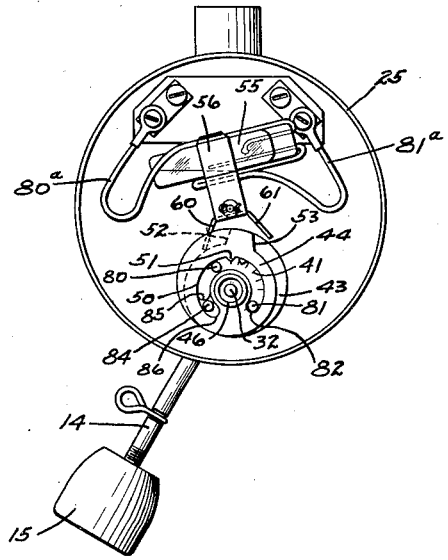
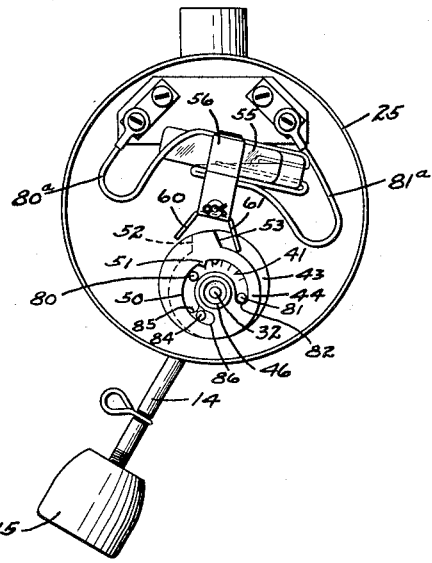
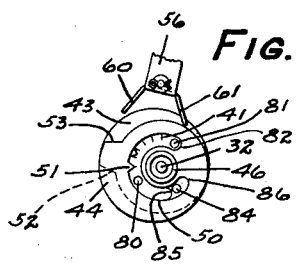
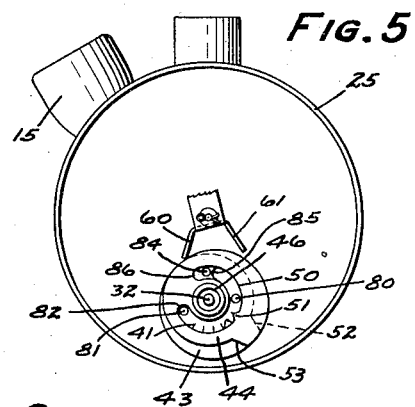
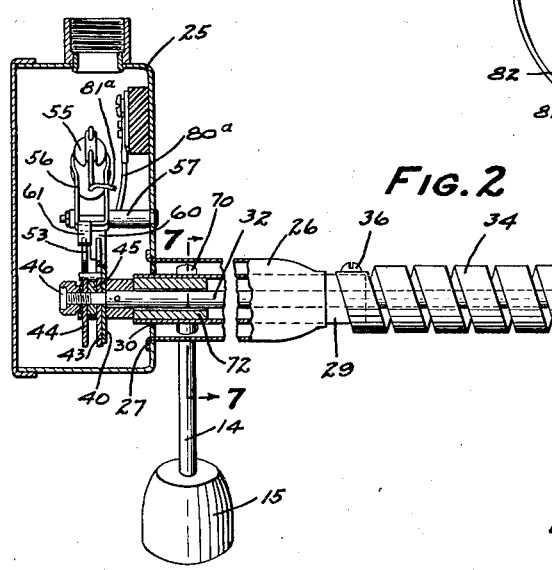
INVENTOR
DANIEL G. TAYLOR
BY Paul, Paul & Moore
ATTORNEYS Patented Aug. 21, 1934

1,970,987

UNITED STATES PATENT OFFICE 1,970,987

TEMPERATURE CONTROL APPARATUS

Daniel G. Taylor, Minneapolis, Minn., assignor to Minneapolis-Honeywell Regulator Company, Minneapolis, Minn., a corporation of Delaware Application January 10, 1931, Serial No. 507,863

13 Claims. (Cl. 200—138).

This invention relates to improvements in thermostatically controlled switch-operating means, and has among its objects to provide an adjustable device which will operate a switch in a manner to have its movable element always move through the same predetermined angle, whatever the degree of motion of the thermostatically controlled element, and whatever the direction of motion, and to provide cam or equivalent means for moving the switch and to have this means adapted for adjustment to operate the switch within any desired temperature range, and so that whatever the adjustment, there is no strain on the operating parts, either on account of temperature over-runs or on account of reversing motions of the thermostatically controlled element.

Features of the invention include the device per se, and sub-combinations of its parts, along with its use in combination with a heating plant.

Objects and advantages of the invention will be set forth in the description of the drawings forming a part of this application, and in said drawings Figure 1 is a view showing the device applied to a hot air furnace for regulating draft fan action, and operable in conjunction with the draft control means of the furnace;

Figure 2 is a vertical longitudinal section through the thermostat taken substantially on line 2—2 of Figure 1, but with the parts positioned in correspondence to Figure 3, that is with the cams capable of performing a switch closing action;

Figure 3 is a face view showing a low temperature position of the disks and with the switch open and corresponding to Figure 2;

Figure 4 is a face view showing a high temperature position of the disks, and with the switch closed;

Figure 5 is a face view with the parts positioned in correspondence to Figure 1, that is with the switch open, and with the disk cams so positioned as to be unable to move the switch by thermostatic action;

Figure 6 is a face view showing the position of the disks, as during a heat over-run, from the position shown in Figure 4; and Figure 7 is a section on line 7—7 of Figure 2 showing the means for turning the disk support and thermostat to a position whereat their movements will not effect a change of position of the switch.

Figure 1:
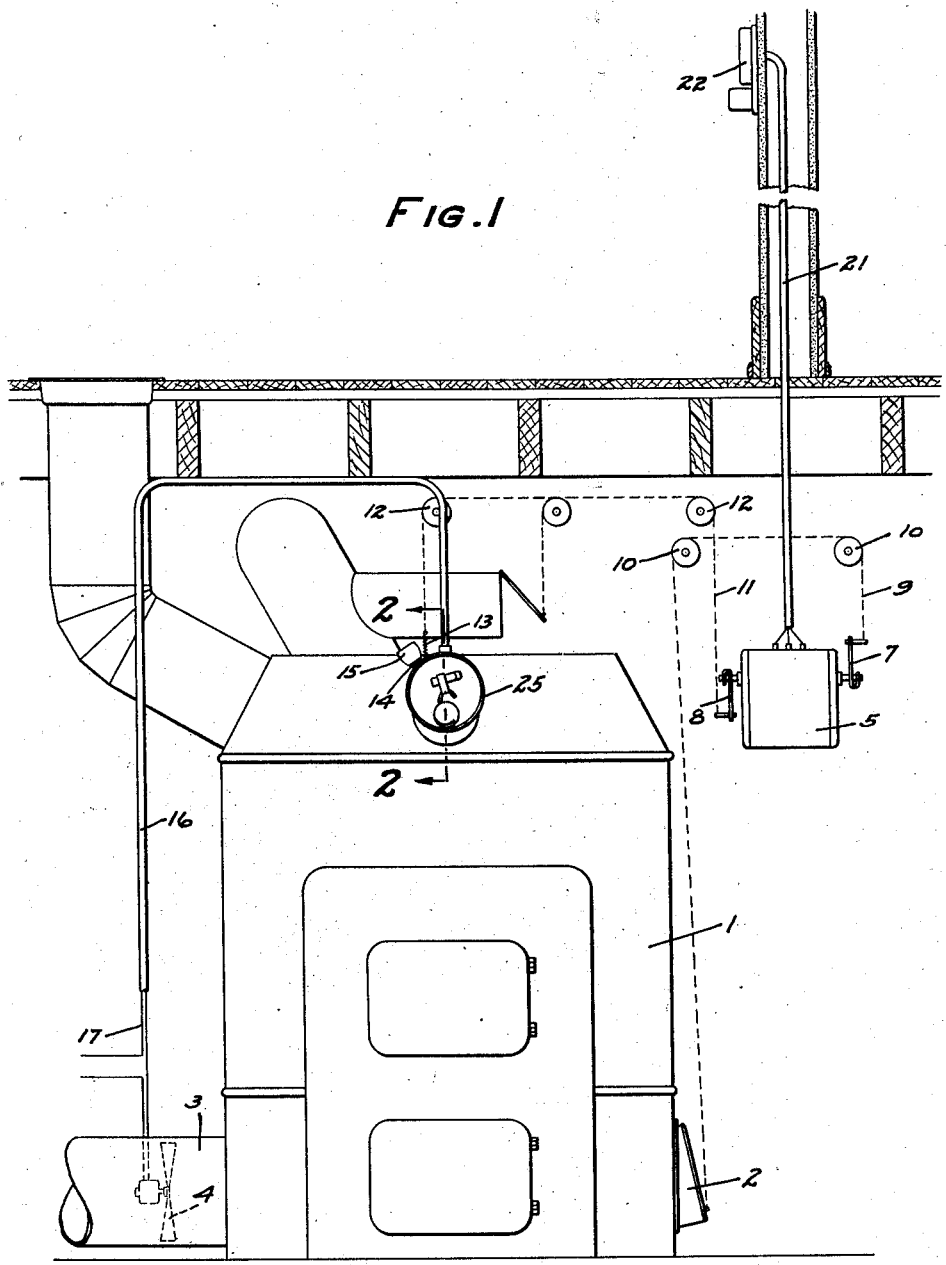

A valuable application of the present invention is shown in Figure 1, in which numeral 1 indicates a hot air furnace, the numeral 2 the ash pit draft door, the numeral 3 the cold air return pipe, and 4 a booster fan for assisting circulation of air in the pipe. Numeral 5 indicates what is known as a "program" motor, which operates the draft doors, and in this instance also effects an adjustment of a switch-operating means to only permit switch closure when the furnace is supplying heat. This motor is electrically controlled by a room thermostat 22, and is electrically connected with the thermostat by suitable conductors passing through conduit 21. When the thermostat calls for heat the motor is energized, the arms 7 and 8 are rotated through an angle of 180° and then the motor automatically stops, and on a call for less heat, the motor is again energized, the arms complete another 180° of rotation in the same direction and again assume the position shown in the drawings. This type of motor is well known and, therefore, its detailed construction is neither illustrated nor described. The arm 8 is attached by a suitable flexible element 11 passing over pulleys 12 to a spring 13 which forms a yieldable connection between the chain and the thermostat adjusting element 14 weighted as at 15. The element 14 is drawn to the position shown in Figure 1 against the action of the weight 15, and on rotation of the arm 8 through an angle of 180° the arm 14 is brought to the position shown in Figure 3.

The thermostatic switch, which is a very important part of the subject-matter of the present application, is used in this embodiment to control current for operating the fan 4. The electrical connections are carried in the conduit 16 and these connections are generally indicated at 17. It will be, of course, understood that the opening and closing of the switch correspondingly stops and starts the fan 4. In this application of the invention, the object is to prevent operation of the fan 4, when the furnace is not supplying heat and conversely to cause the fan to operate as soon as the heater is furnishing the proper amount of heat. It is, of course, obvious that the device illustrated in detail in Figures 2 to 7 inclusive can be used for other purposes than that illustrated in Figure 1. But the device is also claimed in this new combination which includes the idea of bodily adjusting the thermostatic switch control means to maintain a switch-open position of the parts when the draft door is closed, and to set the parts at switch-closed position, as during the summer months when the furnace is not operating.

The arm 7 is connected with the draft door 2 by a suitable chain 9 passing over rollers 10. The arms 7 and 8 are diametrically related. The result is that, on rotation through an arc of 180° from the position shown in Figure 1, draft door 2 is opened, the element 14 is released to be lowered by weight 15 to the position shown in Figure 3, and as herein designed the thermostat is thus conditioned for actuation on rising temperature of the furnace to close the switch. With the parts positioned as shown in Figure 1, that is with the element 14 in its upper position, the switch is locked against thermostatic action in open position, see also Figure 5.

The thermostatic switch is illustrated in detail, in Figures 2 to 7 inclusive. A suitable housing is indicated at 25, and is provided with a tubular bearing extension 26 suitably secured as at 27 to the housing. A tubular support 29 is journaled in an outer reduced portion of the bearing extension, and has one end journaled in an opening 30 of the housing and extends into the housing. The opposite end extends beyond the bearing extension.

Journaled within the tubular support 29 is a rod 32 which projects therebeyond and into the housing, and has its opposite end projecting beyond the opposite end of the tubular support. A coiled thermostatic element 34 has one end connected as at 36 to the element 29 and the opposite end connected at 37 to the rod. The thermostatic element is thus carried by the support 29, and is adapted to rotate the rod in either direction conformably to temperature changes. A dial disk 40 is suitably secured to the rod 32 within the housing, and has graduations 41. The instrument is properly calibrated by submitting the thermostat to some predetermined temperature, say 100° F., and then rotating the disk 40 to register one of its graduations with an imaginary vertical line drawn through the axis of the rod, and then fixing the disk to the shaft for rotation therewith. Rotatably arranged upon the rod are two cams 43—44. The cam 43 abuts the face of dial 40. The cams have the form of stamped disks and are substantially identical in configuration but are placed on the shaft in reverse position as shown. A spacing collar 45 separates the cams as best shown in Figure 2, and a clamping thumb nut 46 in threaded engagement with the rod is adapted to clamp the disks (after adjustment) for motion with the rod. Each cam is provided with an arcuate slot 50 having a pointer 51 extending inwardly from its outer periphery. Through these slots, which are in register, the dial graduations can be observed. Each slot is, of course, concentric with the axis of rotation of the rod. Each cam is also provided with a shoulder. The shoulder of the cam 43 is indicated by the numeral 52, and the shoulder of the cam 44 is indicated by the numeral 53. These shoulders are faced in opposite directions for a purpose presently to be described.

A mercury switch of the usual type is indicated at 55, and this switch is mounted on a support 56. Means pivoting the support to the housing is indicated at 57, and the axis of this means is parallel with the rod axis. The support is disposed over and spaced from the periphery of the cams and the axis of the pivot support lies in a vertical line passing through the axis of the rod 32. The support has extensions respectively indicated at 60—61 and respectively engageable by shoulders 52—53, and by the peripheral surfaces of cams 43—44. Ordinarily the shoulders are arranged in overlapping position as shown in Figure 3. The extensions are divergent toward the cams, and may be said to straddle them. The tube support and extensions are symmetrically balanced with reference to a vertical line drawn through the axes of rod and pivot means 57, so that "over-the-center" action by gravity may be obtained. A radial shoulder may be said to face toward the inner surface of the corresponding extension, that is toward those surfaces of the extensions which are nearest one another. The shoulders may be considered as tangent to a circle of less diameter than the diameter of a cam disk. The cam periphery between the shoulders is substantially spiral, and it will be noted that the cam extensions and cam peripheries are so related that after engagement of either shoulder with its extension and after the support is tipped, there is no binding action between the parts. Thus, during engagement of either shoulder with its extension, the tube support is tilted to a gravity-maintained position, and that whatever the degree and direction of motion of the shaft, no binding action between the extensions and cams can occur. The contact may be said to be gravity-maintained, only between the terminal of one of the extensions and the corresponding cam surface. Referring to Figure 6 (in which an over-run of the thermostat is represented) it is seen that the terminal of the arm 61 rests upon the periphery of the cam 44, while the terminal of the extension 60 is slightly spaced from the periphery of the cam 43. There is no binding action possible between the cam peripheries and the terminals of the extensions. This is a valuable feature of the invention. The spiral shape of the cams, and the fact that each spiral cam is reversed with respect to the other makes binding impossible. There is only one operating shoulder on each cam. It will be further noted that the tube rocks only through a limited and fixed angle irrespective of the degree of temperature variations, or degree of rotative motion of the cams. There is, therefore, no possibility of putting the flexible lead 80ᵃ—81ᵃ under strain which would tend to change the calibration of the instrument.

A valuable feature of the invention relates to the arrangement whereby the support 29 and the disks or cams, can be bodily rotatably adjusted, with reference to the extensions and support, without changing positions of the cams relative to one another. One means for accomplishing this result (see Figure 7) is by providing an arcuate slot 70 in the tubular bearing extension 26, and providing a plurality of angularly related radially disposed threaded openings, in this instance two openings respectively designated 71—75, in the tubular support 29. These openings extend into a plug 72 secured in the rod support 29. The rod 14 has a weight 15 at the lower end, and is selectively connectable with either of these openings. A larger number of openings may be provided. When the rod is in the opening 75, the cams assume the position shown in Figure 3, and are conditioned to permit switch-closing operation as the result of thermostatically initiated rod motion. When the rod is positioned to engage the upper end of the arcuate slot 70 as in Figure 5, no thermostatically initiated switch-closing operation can occur. If the rod 14 is disconnected from the opening 75 and connected with the opening 71 and if, then, the rod is caused to assume the position shown in Figure 7, the cams will assume approximately the position shown in Figure 6, and the switch will be locked in closed position, so that no thermostatically initiated rod motion is great enough to cause shoulder 53 to engage extension 61. Figure 6 may represent positions corresponding either to a heat over-run from the position shown in Figure 4, or to a mechanical lock-out obtained by connecting the rod 14 with the opening 71 and moving it to the position shown in Figure 7.

A valuable feature of the invention relates to the application of the device for regulating booster fan action in the cold air intake of a hot air furnace, in conjunction with draft control means of the furnace, to lock the fan control switch in open position, when the draft control means is operative to prevent heating action of the furnace, and vice versa.

It has before been noted there is a fan 4 for increasing the cold air draft in the furnace, and that there is means 5 (program motor) thermostatically controlled by element 22 for controlling the draft control means 2 through the connections 7 and 10. There is also a thermostatic switch means 25 attached to the furnace. This means has a rotatably adjustable support 29, along with a rod 32 journaled in the support. The thermostatic element 34 is exposed to furnace heat and is adapted to reversely rotate the rod conformably to temperature changes. The switch 55 is electrically connected to control the fan 4, and means, such as the cams 43—44 are arranged upon the rod for operating the switch to close it when the temperature rises and open it when the temperature falls. The means 14 connected to the rod support, is adapted to rotate it either to prevent or permit switch operation as the result of thermostatically initiated rod motion, and means 11 connects 14 with 8 for causing rotative adjustment of the rod to prevent a thermostatically initiated switch-closing motion when the draft control means is in draft-closed condition, and vice versa. It is evident that with the element 14 in a raised position, the cams are so positioned (see also Figure 5) that thermostatic action upon these cams cannot close the switch. On the other hand, it is evident that when the element 8 rotates from its position in Figure 1, through an arc of 180°, 14 is lowered, the rod support is swung and assumes the position shown in Figure 3, wherein the cams are so positioned that the switch may be closed when the disks rotate sufficiently in a counter-clockwise direction, under the heating action of the furnace. However, it will be noted that when the parts are positioned as shown in Figure 3, the door 2 will be open because the arms 7 will also have moved through an arc of 180°.

Means has, therefore, herein been devised by which, through a mechanical connection, thermostatic switch operation is controlled by a damper-operating motor (or damper) so that the fan can be shut off irrespective of temperature of the furnace when the house is sufficiently warm, and means has also been provided so that in the summertime when the furnace is not operating, the fan can be made to operate at all times irrespective of temperature condition in either the furnace or in the house.

The electrical connections with the tube contacts are respectively indicated at 80ᵃ—81ᵃ and it will be seen that no strain can be put upon these conductors by over-motion of the tube support 56 in either direction, because the degree of motion is always the same whatever the temperature or whatever the position of the cams.

It is to be noted that the starting of the fan usually causes a drop of from 15° to 30° in furnace temperature and for the proper operation the cam setting should be wide enough so that the first drop in temperature will not cause immediate stopping of the fan by tilting the mercury tube. Otherwise the fan would be started and stopped rapidly. If, while the fan is operated, the room thermostat calls for less heat, the damper motor closes, the damper lifts the lever 14 and thereby changes the calibration of the thermostatic switch to such degree that the current to the fan is immediately cut off. This is accomplished by turning the thermostat and disk support through an angle of approximately 90°.

Means is provided for limiting the rotative adjustment of the disks 43—44 relative to one another to prevent such a degree of overlap of the shoulders 52—53 as would cause them to assume an inoperative relation with the extensions 60—61. To this end, the dial 40 is provided with two stop pins substantially diametrically related and respectively indicated 80—81. These pins loosely traverse the slots 50 of both disks 43 and 44. The pin 81 and the end 82 of the slot 50 of the disk 44 cooperate to limit adjusting motion of the disk 44 in counter-clockwise direction. Disk 43 is provided with a stop pin 84 which is disposed immediately adjacent the end 85 of the slot 50 of that disk, which pin traverses the slot 50 of the disk 44. This pin 84 and the end 86 of the slot 50 of the disk 44 cooperate to limit counter-clockwise motion of the disk 43, when the pin 81 is engaged with the end 82 of that slot. Pin 80 and the end 85 of slot 50 of disk 43 cooperate to limit clockwise motion of the disk 43, and when 80 and 85 are engaged the pin 84 limits clockwise motion of the disk 44 by engagement of the end 86 of the slot therewith. It will, of course, be understood that these pins may be arranged differently in different installations, and are only for the purpose of limiting disk rotation within the range of the particular design.

I claim as my invention:

1. A bearing, a support journaled therein, a rod journaled in the support, a thermostatic element carried by the support and adapted to rotate the rod in either direction conformably to temperature changes, cams adjustable upon the rod, a rockable support having extensions, each cam being adapted to engage and move the corresponding extension to tip the support, and means to obtain rotative adjustment of first mentioned support to bodily move the cams without changing their positions relative to one another.

2. A housing having a tubular bearing extension and a support journaled therein, a rod journaled in the support, a thermostatic element carried by the support and adapted to rotate the rod in either direction conformably to temperature changes, cams rotatably adjustable upon the rod and means for clamping the cams to the rod after adjustment, a support and means pivoting the support to the housing on an axis substantially parallel with the rod axis, a mercury tube switch on the support at one side of the pivot means, said support having extensions at the opposite side of said pivot means, said tube and extensions being substantially symmetrically balanced with reference to the axes of rod and pivot means, said extension being divergent toward the cams one for each cam and lying at opposite sides of a line drawn through the axes of rod and pivot means, each cam including a radial shoulder adapted to engage and move the corresponding extension to tip the tube said shoulders facing in opposite directions, the cam extensions and cam peripheries being so related that whatever the degree or direction of motion of the shaft, no binding action between the extension and cams can occur, said tubular bearing extension having an arcuate slot, a rod traversing the slot and attached to said rod support, and acting with the slot to prevent axial motion of the support but to obtain rotative adjustment thereof, to bodily adjust both cams relative to the extensions without changing their position relative to one another, said tubular support having a plurality of angularly related radially disposed openings with which said rod is selectably connectable.

3. A housing having a tubular bearing extension and a support journaled therein, a rod journaled in the support, a thermostatic element carried by the support and adapted to rotate the rod in either direction conformably to temperature changes, cam rotatably adjustable upon the rod and means for clamping the cams to the rod after adjustment, a support and means pivoting the support to the housing, a mercury tube switch on the support, said support having extensions divergent toward the cams one for each cam, each cam adapted to engage and move the corresponding extension to tip the tube, said tubular bearing extension having an arcuate slot, a rod traversing the slot and attached to said rod-support, to obtain rotative adjustment thereof and bodily adjust both cams relative to the extensions without changing their position relative to one another.

4. A structure having a support journaled therein, a rod journaled in the support, a thermostatic element carried by the support and adapted to rotate the rod in either direction conformably to temperature changes, cams adjustable upon the rod, a support and means pivoting the support to the structure, a mercury tube switch on the support, said support having extensions, each cam adapted to engage and move the corresponding extension to tip the support and tube, said structure having an arcuate slot, a rod traversing the slot and attached to the rod support to obtain rotative adjustment thereof, and thereby bodily adjust the cams relative to the structure and tube-support extensions, without changing their positions relative to one another.

5. A device of the class described comprising a casing, a coiled thermostatic element outside the casing and connected to the casing, a rod operatively connected to the thermostatic element and extending into the casing, cams within the casing operatively connected to the rod, and having spiral surfaces circuit controlling means pivoted within the casing and having portions engageable by the cams upon rotation of the rod, to move said means to and maintain the same in one of its circuit controlling positions, said cams having their spiral surfaces reversely arranged.

6. A device of the class described comprising controlling means pivoted below its center of gravity, a pair of spiral cams having shoulders engageable with a portion of the controlling means for tipping it alternatively in opposite directions, the peripheries of the cams acting as stops to prevent undue movement of the controlling means after it moves to one side of its pivotal center, an actuator, and means by which the actuator imparts rotative movement to the cams.

7. A device of the class described, comprising an actuator responsive to changes in a physical condition, a rod connected thereto and rotated thereby, a pair of cams mounted on the rod and operatively connected thereto, a circuit controlling device pivoted below its center of gravity, said cams each having a shoulder for engaging a portion of the circuit controlling device and rocking it alternatively in opposite directions upon corresponding rotation of said rod said cams acting as stops to prevent undue movement of the circuit controlling element when in either of its unbalanced positions.

8. A device of the class described, comprising in combination, an actuator responsive to changes in a physical condition, a rod connected thereto for rotation thereby, a circuit controlling element pivoted below its center of gravity, a first cam operatively connected to the rod and having a shoulder for engaging the circuit controlling element to tip the same across its pivotal point upon rotation of the rod in one direction, a second cam operatively connected to the rod and acting as a stop for preventing undue movement of the circuit controlling element in that direction when actuated by the first cam, said second cam having a shoulder for moving the circuit controlling element in the opposite direction upon reverse rotation of the rod, said first cam acting as a stop to prevent undue movement of the circuit controlling element in said opposite direction when actuated by the second cam.

9. A device of the class described comprising a reversely rotatable element, means responsive to physical changes to move the rotatable element, a rockable control element, cams on said rotatable element and projections on said rockable element substantially constantly cooperative with said cams to obtain rocking of said element alternatively in opposite directions conformably to reverse motions of the rotatable element, without binding action between said projections and cam surfaces, and in a manner to hold the control element in any rocked position, against reverse rocking, during continued motion of the cams in the same direction.

10. A device of the class described comprising a reversely rotatable element, means responsive to physical changes to move the rotatable element, a rockable control element having two projections, cams on said rotatable element each having a spiral surface, and said projections substantially constantly cooperating with said spiral surfaces to obtain rocking of said control element alternatively in opposite directions conformably to reverse motions of the rotatable element, without binding action between said projections and cam surfaces, and in a manner to hold the control element in any rocked position against reverse rocking during continued motion of the cams in the same direction.

11. A device of the class described comprising a shaft, cams on the shaft, a rockable switch control member having projections one engageable with each cam, each cam including a cam shoulder, said shoulders facing in opposite directions and away from a line passing through the axes of rotation and rocking respectively of the shaft and control member, and being alternatively engageable with respective arms to rock the control element to a new control position, the cam surface and projections being so related that whatever the degree or direction of the motions there is no binding action therebetween, and so that after one shoulder has acted to rock the control element to one position no further rocking in either direction is possible during continued motion of the shaft and until the other shoulder acts on reverse motion of the shaft to rock the switch in opposite direction.

12. A rockable switch control member, a shaft, means for rotating the shaft in opposite directions conformably to corresponding changes in physical conditions, cams on the shaft, each cam surface being circumferentially spiral, and the direction of the spiral surfaces being reversed, and each including a radial shoulder, the said shoulders being faced in opposite directions, said rockable switch control member having arms engageable by said shoulders to move the rockable switch control member alternately in opposite directions, the said cam surfaces and arms being so related that after either shoulder has performed its rocking function the arms ride on the spiral parts of respective cams to prevent further rocking of the rockable switch control member in either direction.

13. A device of the class described comprising a rotatable element, cams on said rotatable element each having a spiral cam surface including a substantially radial shoulder, said shoulders facing in opposite directions, a rockable control element having two arms divergent toward and normally engageable with respective cam surfaces in opposed relation to respective shoulders, whereby the shoulders act alternatively to engage the corresponding arm to rock the control element in opposite directions, and whereby the arms ride on the spiral cam peripheries to maintain the control element in a rocked position and against reverse rocking during continued motion of the cams in the same direction.

DANIEL G. TAYLOR.